United States Patent [19]

Killat et al.

[11] 4,448,708

[45] May 15, 1984

[54] USE OF QUATERNIZED POLYAMIDOAMINES AS DEMULSIFIERS

[75] Inventors: George R. Killat; Jerry R. Conklin, both of Midland, Mich.

[73] Assignee: The Dow Chemical Company, Midland, Mich.

[21] Appl. No.: 343,782

[22] Filed: Jan. 29, 1982

[51] Int. Cl.³ .................... B01D 17/04; C08G 69/00
[52] U.S. Cl. .................... 252/344; 252/358; 525/451
[58] Field of Search ............ 252/344, 358; 528/332; 525/417, 540, 420, 426, 27, 51

[56] References Cited

U.S. PATENT DOCUMENTS

| | | | |
|---|---|---|---|
| 3,424,794 | 1/1969 | Miller et al. | 252/358 |
| 3,528,928 | 9/1970 | Rushton | 252/344 |
| 3,585,148 | 6/1971 | Sackis | 252/344 |
| 3,900,423 | 4/1975 | Markofsky | 252/344 |
| 3,929,632 | 12/1975 | Buriks et al. | 252/358 |
| 4,088,600 | 5/1978 | Tutein et al. | 252/344 |
| 4,141,854 | 2/1979 | Pavilcius et al. | 252/358 |
| 4,179,396 | 12/1979 | Gabel et al. | 252/358 |
| 4,277,581 | 7/1981 | Vanderberghe et al. | 528/332 |

FOREIGN PATENT DOCUMENTS 379396  9/1932  United Kingdom ................ 252/344

*Primary Examiner*—Allan Lieberman

[57] ABSTRACT

Emulsions of oil and water are resolved by contacting the emulsions with a quaternized polyamidoamine having pendent quaternary ammonium moieties, e.g., an adduct of (1) polyamidoamine prepared from methyl methacrylate and ethylenediamine and (2) 2-hydroxy-3-chloropropyl trimethyl ammonium chloride.

11 Claims, No Drawings

USE OF QUATERNIZED POLYAMIDOAMINES AS DEMULSIFIERS

BACKGROUND OF THE INVENTION

This invention relates to the use of quaternized polyamidoamines in the preventing, breaking or resolving of emulsions of the water-in-oil type as well as oil-in-water type emulsions.

Most naturally occurring emulsions of petroleum oil and water take the form of water-in-oil emulsions in which the oil is a continuous phase and tiny drops of water are dispersed in the oil. Occasionally, however, oil-in-water emulsions are encountered either in the production, handling or refining of petroleum oil or fractions thereof. Unfortunately, in both types of emulsions, the emulsions are often extremely stable and will not resolve after standing for long periods. While such emulsions often occur naturally, such emulsions may also occur artificially resulting from one or more of numerous operations encountered in various industries. For example, such emulsions may be obtained from producing wells as a result of enhanced oil recovery methods or from the bottom of crude oil storage tanks. Other such oil-in-water emulsions include steam cylinder emulsions, wax-hexane-water emulsions, butadiene-tar-in-water emulsions, emulsions of flux oil and steam condensate, styrene-in-water emulsions and synthetic latex-in-water emulsions. In all instances, it is generally desirable to resolve the emulsion in order the the oil phase may be separated from the water phase.

Historically, such emulsions have been resolved or broken by contacting the emulsion with a chemical demulsifying agent, thereby causing the emulsions of resolve and stratify into its component phases of water and oil or brine and oil after the emulsion has been allowed to stand in a relatively quiescent state. In another type of demulsification, the emulsion contains substantial quantities of salt in the aqueous phase and it is necessary to carry out a desalting operation prior to further refinement of the oil phase in order to prevent the accumulation of large deposits of salt in the refining apparatus. In such desalting operations, it is common to employ a chemical demulsifying agent in a manner similar to that mentioned hereinbefore. A wide variety of chemical demulsifying agents has been employed in this manner in the past. For example, such demulsifying agents include oxyalkylated condensation products obtained by reacting phenols, formaldehydes and alkylene polyamines as disclosed in U.S. Pat. No. 3,166,516; ultra high molecular weight ethylenically unsaturated polymers, polyalkylene oxylene polymers, polyesters, polyamides, polymer of ketenes and the like as described in U.S. Pat. No. 3,557,017; amidoamine polymers as described in U.S. Pat. No. 3,528,928; as well as other chemicals such as sulfonates, oxyalkylated amines, oxyalkylated alkylphenols, oxyalkylated alcohols and the like. While each of the foregoing and other conventional demulsifiers are effective in some emulsions, it is found that many are not as effective as desired, particularly in resolving emulsions derived from steam recovery of heavy crudes by processes typical of some of the California oil fields.

Accordingly, it is highly desirable to provide a demulsification process for resolving emulsions of such heavy crudes as well as other oil-in-water emulsions and the like.

SUMMARY OF THE INVENTION

In one aspect, the present invention is such a demulsification method which comprises contacting an emulsion of oil and water with a demulsifying amount of a water-soluble quaternized polyamidoamine which is a polymer having amide moieties and amine moieties in its backbone and pendent quaternary ammonium moieties.

While the demulsification method of the present invention is particularly effective in resolving emulsions of crude oils in water as are commonly recovered from oil fields, such demulsification method is also effective for resolving other emulsions of oil-in-water and water-in-oil.

In another aspect, the present invention is a water-soluble quaternized polyamidoamine which is an adduct of a linear polyamidoamine and a quaternary ammonium compound containing a moiety capable of reacting with the polyamidoamine to form the adduct.

DETAILED DESCRIPTION OF THE ILLUSTRATIVE EMBODIMENTS

Emulsions of oil-in-water that are most effectively resolved by the method of this invention are oil field emulsions containing relatively small proportions of crude petroleum oil dispersed in water or brine and are hereinafter characterized as oil-in-water emulsions. Other such oil-in-water emulsions include emulsions in which traces of lubricating oil are found dispersed in steam from steam engines and steam pumps often called steam-cylinder emulsions; emulsions encountered in the waxing operations in oil refining, often called wax-hexane-water emulsions; emulsions of flux oil in steam condensate produced in the catalytic dehydrogenation of butylene to produce butadiene; styrene-in-water emulsions; emulsions generated by sewage disposal operations metal working fluids, oily waters from ship ballast tanks, food processing waste streams and the like. Although not as advantageously resolved as the oil-in-water emusions, water-in-oil emulsions are suitably treated by the method of this invention. Such water-in-oil emulsions are generally those naturally occurring emulsions of water and petroleum oil wherein the continuous oil phase has tiny droplets of water dispersed therein.

The preferred oil-in-water emulsions may contain widely different proportions of dispersed phase, for example, the oil field oil-in-water emulsions may carry crude oil in proportions varying from a few parts per million to about 40 weight percent or higher in rare cases. All of such emulsions are advantageously treated in the practice of this invention, most preferably, however, such oil-in-water emulsions contain from about 0.01 to about 30 weight percent of oil based on the weight of the emulsions. Also, while the method of the present invention is effective in treating emulsions derived from light crudes, the method is also effective in treating emulsions of somewhat heavier crudes.

The quaternized polyamidoamines employed in the present invention are polymers having amide moieties and amine moieties in their backbones and pendent quaternary ammonium moieties represented by the formula:

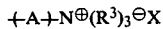

wherein A is a divalent organic radical, $R^3$ is a monovalent organic radical, and $X^{\ominus}$ is an anion. Preferably, such quaternary ammonium moieties are represented by the formula:

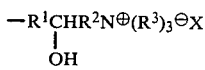
Formula I wherein $R^1$ is a divalent organic radical such as the amidoamine represented by Formula V hereinafter or alkylene, e.g., methylene or ethylene, amidoamino, e.g.,

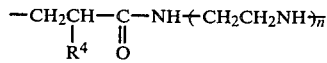

wherein n is 1 or 2 and $R^4$ is hydrogen or $C_1$–$C_4$ alkyl (preferably methyl); $R^2$ is a divalent organic radical such as alkylene, e.g., methylene or ethylene, and the like; each $R^3$ is independently a monovalent organic radical, e.g., alkyl such as methyl or ethyl, hydroxyalkyl such as hydroxyethyl, and the like; and each X is independently a suitable counter anion such as halide, e.g., chloride, sulfate, sulfonate, carboxylate and the like. Suitable, but less preferred, quaternary ammonium moieties include those represented by the formula:

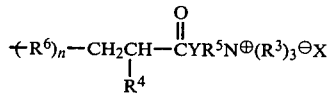
Formula II wherein $R^3$, $R^4$ and X are as defined hereinbefore; $R^6$ is a divalent organic radical containing a primary or secondary amine moiety such as amidoamine; Y is —NH— or —O—; $R^5$ is a divalent organic radical having at least 2 carbons such as alkylene, e.g., ethylene; and n is 0 or 1.

The quaternized amidoamines preferably have repeating units represented by the formula:

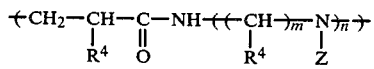
Formula III wherein each $R^4$ is independently hydrogen or $C_1$–$C_4$ alkyl, preferably methyl; each Z is independently hydrogen, a quaternary ammonium moiety as defined hereinbefore, an amidoamine, or

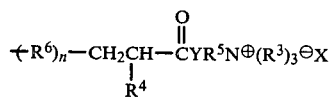

as defined hereinbefore; m is a whole number from 2 to 6, most preferably 2; and n is 1, 2 or 3, most preferably 1 or 2. In the quaternized polyamidoamine, enough of the Z groups are the quaternary ammonium moiety to enable the polyamidoamine to function better as a demulsifier for oil-in-water emulsions than the polyamidoamine containing no quaternary ammonium moiety. Preferably the quaternized polyamidoamine performs at least 10% better as a demulsifier for oil-in-water emulsions than does a similar polyamidoamine containing no quaternary ammonium moiety. In other words, 0.9 weight part or less of the quaternized polyamidoamine will provide the same or better demulsification as 1 weight part of the nonquaternized polyamidoamine will. More preferably, the quaternized polyamidoamine contains from about 0.1 to about 2, most preferably from about 0.3 to about 1, equivalent of the quaternary ammonium moiety per equivalent of amine nitrogen in the polyamidoamine. The preferred quaternized polyamidoamines have weight average molecular weights (Mw) in the range from about 1000 to about 100 million, more preferably from about 1000 to about 1 million. Most preferred polyamidoamines are represented by the formula:

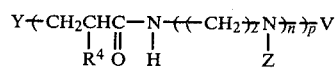
Formula IV wherein Y is a terminal group characteristic of polyamidoamines; V is hydrogen or the residue of polymerization to form a polyamidoamine; n is 1 or 2; and p is 1 to 10,000;

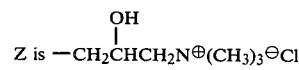

or

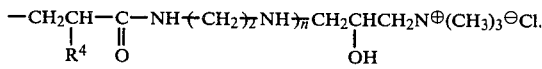

The quaternized polyamidoamine which form another aspect of this invention (1) has a polyamidoamine backbone bearing pendent quaternary ammonium moieties and (2) is an adduct of the linear polyamidoamine described hereinafter and quaternary ammonium compound (hereinafter called a quaternizing agent and described in detail) that contains a moiety capable of reacting with the polyamidoamine to form the adduct. These adducts may contain from 0.1 to 2, preferably from 0.1 to 1, mole of pendent quaternary ammonium moiety per mole of amine nitrogen in the polyamidoamine.

The quaternized polyamidoamines are advantageously prepared by reacting a linear or branched polyamidoamine with a suitable quaternizing agent. This quaternizing reaction is preferably practiced by adding the suitable quaternizing agent to the polyamidoamine at temperatures from ambient to 80° C. It is preferable to carry out the reaction in water or a water-miscible, solvent for the polyamidoamine such as an alcohol, most preferably methanol. The quaternizing agent is preferably added as an aqueous solution containing from about 25 to about 60 weight percent of the quaternizing agent. The mixture is then adjusted to alkaline conditions, e.g., pH=8–10, by the addition of an aqueous solution of sodium hydroxide or other strong base. The resulting mixture is then heated, e.g., to 90° C., until the reaction is complete. The mole ratio of the quaternizing agent to pendent amino moieties in the polyamidoamine is sufficient to provide the desired degree of quaternization as described hereinbefore, preferably stoichiometric amounts of quaternizing agent and pendent amine moiety.

Preferred quaternizing agents are compounds containing (1) a quaternary ammonium moiety or a moiety that can be readily converted to a quaternary ammonium moiety such as a tertiary amine moiety and (2) a reactive moiety which is capable of reacting with the amine nitrogens of the polyamidoamine. Examples of such reactive moieties are ethylenically unsaturated groups capable of undergoing a Michael addition reaction, epoxy groups and haloalkyl groups. Examples of the quaternizing agents include amino and ammonium alkyl esters of α,β-ethylenically unsaturated carboxylic acids such as N,N-dimethylaminoethyl acrylate and 2-acryloyloxyethyl trimethyl ammonium chloride; N-substituted α,β-ethylenically unsaturated amides such as methacrylamidopropyl trimethyl ammonium chloride and acrylamidopropyl trimethyl ammonium chloride; epoxy alkyl quaternary ammonium compounds such as 2,3-epoxypropyl trimethyl ammonium chloride and epoxyalkyl amines such as 2,3-epoxypropyl dimethyl amine; and halohydrins of quaternary ammonium salts such as halohydroxyalkyl trialkyl ammonium salts, with the hydroxyhaloalkyl trialkyl ammonium salts being more preferred. Examples of such more preferred quaternary ammonium salts include 2-hydroxy-3-chloropropyl trimethylammonium chloride, and similar hydroxyhaloalkyl trialkyl ammonium, with 2-hydroxy-3-chloropropyltrimethylammonium chloride being most preferred.

The linear polyamidoamines used to prepare the quaternized linear polyamidoamines and the branched polyamidoamines are conveniently prepared in the manner described in U.S. Pat. No. 3,305,493, the relevant portions of which are incorporated by reference herein. In general, an alkylene diamine (where n=1) or a polyalkylene polyamine (where n>1) is contacted at reactive conditions with an alkyl acrylate or methacrylate or less desirably acrylamide, acrylic acid or methacrylic acid to prepare an essentially linear polyamidoamine. Preferably, the reactants are employed in close to their stoichiometric ratio. This linear polyamidoamine consists of units of the formula

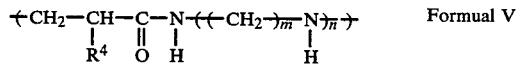  Formual V wherein R⁴ is as defined hereinbefore, m is a whole number from 2 to 6 and n is 1 to 6.

Exemplary alkylene polyamines and polyalkylene polyamines include ethylenediamine, diethylenetriamine, triethylenetetramine, tetraethylenepentamine, pentaethylenehexamine, hexaethyleneheptamine, 1-aminoethylpiperazyl diethylenetriamine, 1-aminoethylpiperazyl triethylenetetramine, propylenediamine, dipropylenetriamine, butylenediamine, aminoethylpropylenediamine and other polyamines having at least one primary amino group separated from another primary amino or secondary amino group by 2 to 4 carbon atoms. Of these polyalkylene polyamines, the higher molecular weight polyethylene polyamines and polypropylene amines such as those having a weight average of 100 to 15,000 are preferred. Of particular interest are the polyalkylene polyamines that are crosslinked with ethylene dichloride or the like as well as mixtures of such cross-linked polyamines with other polyalkylene polyamines as mentioned hereinbefore.

The branched polyamidoamine is preferably prepared by contacting the linear polyamidoamine with an ethylenically unsaturated ester, acid or amide under conditions sufficient to cause a Michael addition reaction between the amino moieties of the polyamidoamine and the ethylenically unsaturated moieties of the ester, acid or amide. Preferably, the unsaturated compound is an alkyl ester of acrylic or methacrylic acid, most preferably methyl acrylate or ethyl acrylate.

The addition of the ethylenically unsaturated compound to the linear polyamidoamine should be performed at a temperature which avoids substantial crosslinking of the polymer. Generally, a temperature in the range from about 0° C. to about 80° C. is operable, with temperatures from about 0° C. to about 50° C. being preferred. This reaction can be conducted neat. However, the presence of a diluent which dissolves the polyamidoamine but is substantially inert to the reactants is desirable as it facilitates more complete mixing and more efficient heat transfer of the reaction medium during the exothermic Michael addition reaction. Water and C₁ to C₄ alcohols are preferred diluents. Methanol is the most preferred diluent.

The ratio of the equivalents of the aforementioned unsaturated compound to the equivalents of labile hydrogens borne by the nitrogen atoms in the linear polyamidoamine can be varied to produce the desired substitution of pendant ester groups on the polyamidoamine. If complete substitution is desired, a stoichiometric amount or an excess of the alkyl acrylate or other unsaturated compound can be employed. If a lesser degree of substitution is desired, the reactants can be combined in the appropriate ratios and essentially completely reacted. It is desirable that at least about 10 percent of the labile hydrogens be reacted with alkyl acrylate or the other unsaturated reactants to endow the ultimate branched polymer with the unique properties and advantages described herein.

The polyamidoamine bearing pendant groups corresponding to the following formula:

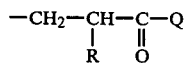 Formula VI wherein R is —H or —CH₃ and Q is —OH, —NH₂ or a C₁-C₁₀ alkoxy is reacted with an alkylene diamine or polyalkylene polyamine as defined hereinbefore to produce the branched polyamidoamines. Prior to introduction of the polyamine, essentially all of the unreacted alkyl acrylate or methacrylate or corresponding acid or amide can be removed by distillation. Preferably only the amount of alkyl acrylate or methacrylate sufficient to produce the desired degree of substitution is added to reaction mixture containing the linear polyamidoamine. A sufficient amount of the polyamine is advantageously employed to suppress cross-linking of the polyamidoamine which can occur through the pendant moieties corresponding to Formula I. Typically, a 200 to 300 mole percent excess of the polyamine relative to the moieties of Formula I on the polyamidoamine is sufficient to avoid gelation of the polyamidoamine due to cross-linking.

The conditions necessary to promote reaction of the substituted polyamidoamine with the polyamine will vary dependent on the identity of Q in the pendant groups corresponding to Formula VI. If Q is a C₁ to C₁₀ alkoxy, the reaction involves a simple amidation of the pendant ester groups on the polyamidoamine which proceeds under relatively mild conditions. This amidation of the ester occurs readily at temperatures in the range from about 20° C. to about 150° C. The amidation of the ester can be performed neat, but an inert diluent in which the reactants are soluble is preferably present. Water is a preferred diluent, but hydrolysis of the ester groups present can occur at higher reaction temperatures unless an excess of the polyamine reactant is present. Methanol or other lower alkanols are also preferred as diluents.

If Q in Formula VI is —OH or —NH$_2$, more severe reaction conditions must be utilized than when Q is an alkoxy group. Reaction temperatures in the range from about 100° C. to about 200° C. are generally operable, with temperatures of from about 130° to about 170° C. being preferred. Generally, a diluent is not necessary at these reaction conditions because the substituted polyamidoamine is readily agitated at these reaction temperatures.

The branched polyamidoamine is conveniently recovered by distillation of solvents and by-products from the polymer at reduced pressure. The time required to effect substantially complete reaction will vary dependent on the reaction temperature and other factors. Alternatively, the branched polyamidoamine may be quaternized in the reaction mixture, thereby avoiding expense of removing solvent or by-products in this step.

In the practice of this invention, the emulsion to be resolved is contacted with an amount of the quaternized polyamidoamine which is effective to cause the emulsion to separate into two essentially distinct phases upon standing. Generally, such an amount will be in the range from about 1 to about 1,000 weight parts of the adduct per million weight parts (ppm) of the emulsion, preferably from about 10 to about 200 ppm.

The following examples are given to further illustrate the detailed practice of the invention and should not be construed as limiting its scope. Unless otherwise indicated, all parts and percentages are by weight.

EXAMPLE 1

Following the procedure described in U.S. Pat. No. 3,528,928, a linear polyamidoamine is prepared by contacting 10 moles of ethylenediamine with 10 moles of methyl methacrylate under nitrogen, while refluxing and stirring the reactants at a temperature of 90°–100° C. for 8 days. A linear polyamidoamine having a molecular weight (Mw) of 15,000 is produced.

Into a 250 ml, 3-neck, round-bottom flask equipped with thermometer, stirrer, reflux condenser and heating mantle is charged 27.61 g of a 50 percent solution of 2-hydroxy-3-chloropropyl trimethyl ammonium chloride in water and 73.1 g of a 35 percent solution of the aforementioned linear polyamidoamine in methanol. The resulting mixture is maintained at 50° C. for 7 days. Infrared analysis of the resulting product indicates the expected partially quaternized polyamidoamine represented by the following formula:

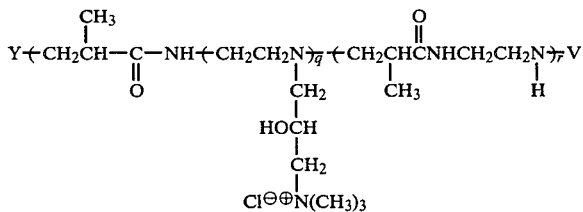

wherein Y is an initiating group such as NH$_2$CH$_2$CH$_2$NH—, V is a terminating group such as hydrogen and q and r are numbers indicating the degree of quaternization and $r+q = \sim 115$.

To 10 grams of an oil-in-water emulsion containing about 10 weight percent of crude oil having a specific gravity of ~0.8 g/ml is added about 7.4 parts per million based on the emulsion of the aforementioned quaternized polyamidoamine. The emulsion is then shaken on a wrist-action shaker for 5 minutes to effectively disperse the quaternized polyamidoamine into the emulsion. Thereafter, the emulsion is allowed to stand for 1 minute, visually evaluated and allowed to stand for 24 hours and then visually evaluated again.

The results of these evaluations are reported in Table I.

For purposes of comparison, the aforementioned and other quaternized polyamidoamines and nonquaternized polyamidoamines are similarly tested as demulsifiers at various concentrations and the results are reported in Table I.

TABLE I

| Sample No. | Quaternized Polyamidoamine (1) | | | Performance Rating (2) | |
|---|---|---|---|---|---|
| | Mw | Mole Ratio of Quat to Amine | Concentration, ppm | After One Minute | After 24 Hours |
| 1 | 15,000 | 1:2 | 2.4 | 5 | 4 |
| | | 1:2 | 7.4 | 1 | 1 |
| | | 1:2 | 12.2 | 1 | 1 |
| | | 1:2 | 24.5 | 3 | 2 |
| 2 | 15,000 | 1:1 | 2.4 | 4 | 3 |
| | | 1:1 | 7.4 | 1 | 1 |
| | | 1:1 | 12.2 | 3 | 2 |
| | | 1:1 | 24.5 | 4 | 3 |
| C$_1$* | 15,000 | 0:1 | 2.4 | 5 | 4 |
| | | 0:1 | 7.4 | 3 | 3 |
| | | 0:1 | 12.2 | 2 | 1 |
| | | 0:1 | 24.5 | 1 | 1 |
| 3 | 1500 | 1:2 | 2.4 | 5 | 4 |
| | | 1:2 | 7.4 | 2 | 2 |
| | | 1:2 | 12.2 | 1 | 1 |
| | | 1:2 | 24.5 | 1 | 1 |
| C$_2$* | 1500 | 0:1 | 2.4 | 5 | 5 |
| | | 0:1 | 7.4 | 3 | 2 |
| | | 0:1 | 12.2 | 2 | 1 |
| | | 0:1 | 24.5 | 2 | 1 |

*Not an example of the invention.
(1) Linear polyamidoamine having the weight average molecular weight (Mw) as determined by low angle laser light scatting and the mole ratio of quaternary ammonium moiety to amino moiety as indicated in the table. The concentration of polyamidoamine in the emulsion is given in parts per million.
(2) Performance rating based on visual evaluation with the ratings having the following meanings:
1 - excellent resolution of the emulsion - clear aqueous phase and well defined interface, bright oil.
2 - good resolution - slight cloudy aqueous phase and well defined interface.
3 - marginal resolution - cloudy aqueous phase and poorly defined interface.
4 - poor resolution - nearly opaque aqueous phase and little, if any, oil phase.
5 - not active - treated emulsion essentially the same as untreated emulsion.

Sample Nos. C$_1$ and C$_2$ in Table I are linear polyamidoamines differing only in molecular weight. Sample Nos. 1, 2 and 3 are quaternized polyamidoamines of the present invention, having been synthesized from above Sample Nos. C$_1$ or C$_2$ as the desired molecular weight dictated.

As evidenced in Table I, the quaternized polyamidoamines more efficiently demulsify this naturally occurring oil field oil-in-water emulsion. Typically, excellent performance is obtained at one-half the concentration required by the nonquaternized polyamidoamines.

Also, an increase in demulsification effectiveness by quaternization is apparent since a superior resolution is not obtained at any concentration using the 1500 Mw nonquaternized polymer.

In this particular field emulsion, Sample No. 1 is more effective than Sample No. 2, indicating that partial quaternization is preferential.

EXAMPLE 2

Three different oil-in-water emulsions are prepared by the following procedures.

Emulsion 1

An oil composition (100 g) is prepared by mixing 42.5 g of mineral oil, 37.6 of oleic acid and 19.9 g of an alkylaryl polyether (nonionic surfactant having an HLB of 14) sold as Triton ® CF-10 by Rohm and Haas. A 2.5-g portion of this oil composition is dispersed in a liter of tap water and shaken to form an emulsion which is stable after standing for 4 days.

Emulsion 2

An oil composition is prepared by 0.94 g of oleic acid and 1.06 g of mineral oil. This composition is then emulsified in a liter of tap water by mixing in a Waring Blendor at high speed for 2 minutes. The phases of this emulsion begin to separate after standing for 12 hours.

Emulsion 3

An aqueous solution of 1.02 g of sodium oleate in 21.6 mls of deionized water is mixed with 1.06 g of mineral oil. This oil/water composition is then diluted to 1 liter by addition of tap water and mixed in a Waring Blender at high speed for 2 minutes. The phases of the resulting emulsion began to separate after standing for 3 days.

Several chemical demulsifiers including quaternized polyamidoamines of the present invention as well as others as specified in Table II are added to separate samples of the aforementioned emulsions. The results are reported in Table II.

TABLE II

| Sample No. | Emulsion No. | Demulsifier (1) Type | Amt, ppm | Performance Rating (2) After One Minute | After 24 Hours |
|---|---|---|---|---|---|
| C₁* | 1 | PAMAM (0:1) | 100 | 5 | NM |
|  |  |  | 200 | 4 | NM |
|  |  |  | 300 | 3 | NM |
|  |  |  | 400 | 3 | NM |
|  |  |  | 500 | 5 | NM |
| 1 | 1 | PAMAM (1:10) | 100 | 5 | NM |
|  |  |  | 200 | 4 | NM |
|  |  |  | 250 | 1 | NM |
|  |  |  | 300 | 3 | NM |
|  |  |  | 350 | 5 | NM |
| 2 | 1 | PAMAM (1:4) | 100 | 5 | NM |
|  |  |  | 200 | 5 | NM |
|  |  |  | 250 | 4 | NM |
|  |  |  | 300 | 2 | NM |
|  |  |  | 350 | 3 | NM |
|  |  |  | 400 | 4 | NM |
|  |  |  | 450 | 5 | NM |
| 3 | 1 | PAMAM (1:2) | 100 | 5 | NM |
|  |  |  | 200 | 4 | NM |
|  |  |  | 250 | 3 | NM |
|  |  |  | 300 | 2 | NM |
|  |  |  | 350 | 2 | NM |
|  |  |  | 400 | 3 | NM |
|  |  |  | 450 | 4 | NM |
| 4 | 1 | PAMAM (3:4) | 100 | 5 | NM |
|  |  |  | 200 | 2 | NM |
|  |  |  | 300 | 2 | NM |
|  |  |  | 350 | 3 | NM |
|  |  |  | 400 | 4 | NM |
|  |  |  | 500 | 5 | NM |
| 5 | 1 | PAMAM (1:1) | 100 | 4 | NM |
|  |  |  | 150 | 3 | NM |
|  |  |  | 200 | 2 | NM |
|  |  |  | 250 | 1 | NM |
|  |  |  | 300 | 2 | NM |
|  |  |  | 350 | 3 | NM |
|  |  |  | 400 | 4 | NM |
|  |  |  | 500 | 5 | NM |
| C₂* | 2 | PAMAM (0:1) | 10 | 5 | 5 |
|  |  |  | 50 | 5 | 5 |
|  |  |  | 100 | 5 | 4 |
|  |  |  | 150 | 4 | 3 |
|  |  |  | 250 | 2 | 2 |
|  |  |  | 300 | 1 | 1 |
|  |  |  | 500 | 1 | 1 |
| 6 | 2 | PAMAM (1:10) | 10 | 5 | 5 |
|  |  |  | 50 | 5 | 4 |
|  |  |  | 100 | 3 | 2 |
|  |  |  | 150 | 2 | 1 |
|  |  |  | 200 | 1 | 1 |
|  |  |  | 500 | 2 | 1 |
| 7 | 2 | PAMAM (1:2) | 10 | 5 | 5 |
|  |  |  | 50 | 2 | 1 |
|  |  |  | 100 | 1 | 1 |
|  |  |  | 200 | 1 | 1 |
|  |  |  | 250 | 1 | 1 |
|  |  |  | 500 | 5 | 5 |
| 8 | 2 | PAMAM (1:1) | 10 | 4 | 1 |
|  |  |  | 25 | 1 | 1 |
|  |  |  | 100 | 2 | 1 |
|  |  |  | 150 | 3 | 1 |
|  |  |  | 200 | 4 | 2 |
|  |  |  | 300 | 5 | 5 |
| C₃* | 2 | PAPA (0:1) | 10 | 5 | 5 |
|  |  |  | 25 | 3 | 3 |
|  |  |  | 50 | 1 | 1 |
|  |  |  | 100 | 3 | 3 |
|  |  |  | 150 | 5 | 5 |
| C₄* | 2 | PAPA (1:10) | 10 | 2 | 2 |
|  |  |  | 25 | 1 | 1 |
|  |  |  | 50 | 1 | 1 |
|  |  |  | 100 | 4 | 2 |
|  |  |  | 150 | 5 | 5 |
| C₅* | 2 | PAPA (3:4) | 10 | 2 | 2 |
|  |  |  | 25 | 2 | 1 |
|  |  |  | 50 | 3 | 1 |
|  |  |  | 100 | 4 | 2 |
|  |  |  | 150 | 5 | 4 |
| C₆* | 3 | PAMAM (0:1) | 50 | 5 | 5 |
|  |  |  | 100 | 5 | 5 |
|  |  |  | 200 | 5 | 5 |
|  |  |  | 500 | 5 | 5 |
| 9 | 3 | PAMAM (1:1) | 50 | 5 | 5 |
|  |  |  | 100 | 4 | 4 |
|  |  |  | 150 | 1 | 1 |
|  |  |  | 250 | 2 | 1 |
|  |  |  | 500 | 5 | 5 |

*Not an example of the invention.
(1) Amt. - amount of demulsifier added to emulsion in parts of demulsifier per million parts of emulsion.
PAPA -polyethylene polyamine having Mw in range of 50,000–100,000.
PAMAM - polyamidoamine having a Mw of 15,000.
Ratio given in ( ) is mole of reacted 3-chloro-2-hydroxypropyl trimethyl ammonium chloride per mole of amine moiety in the polyamidoamine or polyethylene polyamine as indicated.
(2) Same as in Table I.
NM - not measured.

As evidenced by the data shown in Table II, the quaternized polyamidoamines of the present invention exhibit greater activity at lower concentrations than do the nonquaternized polyamidoamines.

What is claimed is:

1. A demulsification method which comprises contacting an emulsion of oil and water with an amount of a water-soluble quaternized polyamidoamine effective to cause the emulsion to separate into two essentially distinct phases, said quaternized polyamidoamine (1) having amide and amine moieties in its backbone and pendent quaternary ammonium moieties and (2) being an adduct of a polyamidoamine and a quaternary agent containing the quaternary ammonium moiety and a moiety capable of reacting with the polyamidoamine.

2. The method of claim 1 wherein the emulsion is an oil-in-water emulsion.

3. The method of claim 1 wherein the quaternary ammonium moiety is represented by the formula:

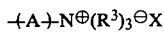

wherein A is a divalent organic radical, each $R^3$ is independently a monovalent organic radical, and $X^\ominus$ is an anion.

4. The method of claim 1 wherein the quaternary ammonium moiety is represented by the formula:

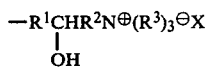

wherein $R^1$ is a alkylene or amidoamine, $R^2$ is alkylene, $R^3$ is alkyl or hydroxyalkyl, and $X^\ominus$ is an anion.

5. The method of claim 4 wherein the quaternized polyamidoamine has a repeat unit represented by the formula:

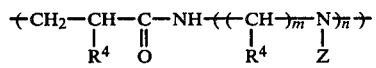

wherein each $R^4$ is independently hydrogen or methyl, each Z is independently the quaternary ammonium moiety, n is 1, 2 or 3 and m is a whole number from 2 to 6.

6. The method of claim 5 wherein the quaternized polyamidoamine contains from 0.1 to 1 equivalent of the quaternary ammonium moiety per equivalent of amine nitrogen in the polyamidoamine.

7. A quaternized polyamidoamine having a polyamidoamine backbone bearing sufficient pendent quaternary ammonium moiety to enable the quaternized polyamidoamine to function at least 10 percent better as a demulsifier for oil-in-water than does a polyamidoamine which is similar to the quaternized polyamidoamine except that it contains no pendent quaternary ammonium moieties, said quaternized polyamidoamine being an adduct of a polyamidoamine and a quaternizing agent selected from the group consisting of 2-hydroxy-3-chloropropyl trimethyl ammonium chloride, methacrylamidopropyl trimethyl ammonium chloride, 2-acryloyloxyethyl trimethyl ammonium chloride, N,N-dimethylaminoethyl acrylate, acrylamidopropyl trimethyl ammonium chloride, 2,3-epoxypropyl trimethyl ammonium chloride and 2,3-epoxypropyl dimethylamine.

8. The quaternized polyamidoamine of claim 7 wherein the quaternizing agent is 2-hydroxy-3-chloropropyl trimethyl ammonium chloride.

9. The quaternized polyamidoamine of claim 7 wherein the quaternizing agent is 3-methacrylamidopropyl trimethyl ammonium chloride or 2-acryloyloxyethyl trimethyl ammonium chloride.

10. The quaternized polyamidoamine of claim 7 or 8 which contains from about 0.1 to 1 equivalent of the quaternary ammonium moiety per equivalent of amine nitrogen in the polyamidoamine.

11. The quaternized polyamidoamine of claim 7 wherein the quaternizing agent is N,N-dimethylaminoethyl acrylate, 2-acryloyloxyethyl trimethyl ammonium chloride, methacrylamidopropyl trimethyl ammonium chloride, acrylamidopropyl trimethyl ammonium chloride, 2,3-epoxypropyl trimethyl ammonium chloride, 2,3-epoxypropyl dimethyl amine, and 2-hydroxy-3-chloropropyl trimethylammonium chloride.

* * * * *